Patented May 31, 1938

2,119,231

UNITED STATES PATENT OFFICE 2,119,231

PROCESS OF RECOVERING MERCURY FROM ANTIMONY-CONTAINING ORES

Reed W. Hyde, Summit, and Robert H. Cromwell, East Orange, N. J., assignors, by direct and mesne assignments, of one-half to Dwight & Lloyd Sintering Company, Inc., New York, N. Y., a corporation of Delaware, and one-half to Associated Metals & Minerals Corporation, New York, N. Y., a corporation of New York No Drawing. Application May 7, 1937, Serial No. 141,242

8 Claims. (Cl. 75—8)

Our present invention relates to a process by which mercury may be volatilized and recovered from ores, or ore concentrates, containing considerable parts of antimony in the form of a sulphide or similar compound.

Mercury compounds such as the sulphide and the oxide decompose at relatively low temperatures, that is, at temperatures of about 360° C. so that upon heating a compound such as the mercury sulphide to this temperature, metallic mercury is volatilized and may thereupon be condensed in the form of the liquid metal. This process of heating and condensing is, therefore, applicable to many mercury ores, as by roasting them on a suitable sintering machine such as those of the Dwight & Lloyd type. However, some ores such as Livingstonite contain considerable quantities of antimony in the form of the sulphide and when ores of this type rich in both antimony and mercury, or concentrates of ores, are subjected to heat by combustion in a suitable apparatus such as the sintering furnace, difficulties are encountered which prevent or impede the efficient working of the process.

One difficulty heretofore encountered in roasting ores containing antimony sulphide, has been due to the melting of the antimony sulphide which thereby obstructs the draft through the sintering furnace and prevents the further roasting and recovery of mercury. Also certain of the oxides of antimony formed by roasting are volatile and, therefore, are vaporized together with the mercury. This not only prevents the separation of the two metals and impoverishes the residues from which the antimony is to be recovered, but also prevents the condensation and recovery of the volatilized mercury which is thereupon carried to a large extent by the furnace gases into the atmosphere and lost. For example, the antimony trioxide ($Sb_2O_3$) is volatile at the ordinary roasting temperatures. It may be converted to the tetroxide ($Sb_2O_4$) by heating with excess air. The tetroxide is non-volatile and under proper temperature conditions is effectively retained with the residues on the grate to form a rich antimony-containing material. The pentoxide ($Sb_2O_5$) decomposes at about 300° C. to the tetroxide, but above 950° C. decomposes to oxygen and the volatile trioxide. Ordinarily in treating concentrates of the sulphides of antimony and mercury by roasting and oxidizing the sulphur, the fusing of the sulphide and the volatilization of the antimony and its interference with the condensation of the mercury present great difficulties.

These difficulties are obviated by our present process which enables the ore concentrates to be roasted and oxidized by a blast of air without such sintering as would interfere with the blast, and provides a temperature control whereby the non-volatile oxides of antimony are formed and left in the residue thereby to effect a clean separation and condensation of the mercury.

In our process we provide a layer of the ore concentrates in such form as to prevent the fusing together of the antimony sulphide during roasting to a mass that is not readily permeable to air. For this purpose we admix with the concentrate bed a diluent which itself is not fusible at the temperature of roasting and which provides the permeability for the oxidizing blast of air. This diluent also has considerable heat absorbing capacity, so that it serves to hold the temperature to a predetermined limit, as for example, at a temperature not exceeding about 950° C. at which the antimony oxides tend to decompose to the trioxide rather than to the non-volatile tetroxide. The bed of concentrates containing the diluent is of limited thickness, as for example, from two to four inches in thickness as compared with the ordinary thicknesses of five to eight inches, employed in Dwight & Lloyd sintering machines, so as to avoid the packing of the charge and also to avoid the retention of heat within the bed. The burning or roasting of the concentrates is done quickly at comparatively low temperatures and with an ample air supply, so as to form the antimony tetroxide and avoid the trioxide which might occur with a long continued slow roasting. The temperature is controlled even with a fast roasting by the use of the diluent and by regulation of air supply so that it can not exceed about 950° C. for any substantial period of time, such as a minute.

Any suitable diluent having the required porosity and rendering the roasting bed porous may be employed. However, it is desirable for the subsequent working up of the residues into antimony to prevent too great a dilution of the antimony content. A diluent containing antimony is, therefore, preferable. Such a diluent is the sintered product from a previous roast because, being in the form of the oxide, it has substantially no fuel value and is in a sufficiently porous condition and, therefore, absorbs heat while at the same time maintaining the porosity and the concentration of the antimony in the roasting bed. A layer of sinter is also desirable as a support for the roasting bed in down-draft roasting as it tends to catch or retain any antimony oxides that may be volatilized.

In the practice of our invention, therefore, we admix with a mercury-antimony concentrate, or with a sufficiently rich ore, a quantity of sintered residue from a previous roasting. The crushed sinter cake is, therefore, mixed and worked into the moist or moistened concentrate which is generally in the form of a moistened powder or mud, and the mixture is pelletized and spread to a depth of from two to four inches onto a sintering grate, on which there has preferably been placed a thin layer of crushed sinter. The surface of the bed is then ignited and a blast of air blown through it to burn the sulphur content and supply the heat to bring the temperature of the bed high enough to volatilize its mercury content. The sintering then takes place as the combustion zone travels through the bed from the ignition surface to the opposite surface at a temperature maintained below about 950° C. by the presence of the diluent and by the nature of the sintering operation. A suitable temperature for the process is between 800° C. and 950° C. The mercury volatilized by the roasting then passes out of the grate with the combustion gases and is recovered by cooling the latter. It may then be recovered as a condensate. The percentage of antimony in the sintered residue is increased by the removal of the mercury and sulphur. It may then be smelted or reduced to obtain the metallic antimony. The blast may be forced through the bed in any suitable direction, but a down-draft is preferably employed as it is more convenient and is less likely to carry suspended solid particles which contaminate the mercury condensate.

For example, a concentrate was obtained by flotation methods with a content of about 7.1% of mercury and 19.5% of antimony. This concentrate was mixed with previously roasted sinter of preferably 6 mesh or less, and formed into a sintering bed of about two inches or from two to four inches deep. The sinter was mixed with the concentrate in the proportions of 11½ parts of sinter to 32 parts of concentrates. Mixtures containing equal parts of crushed sinter and concentrates were also highly satisfactory as were various intermediate proportions. The quantity of sinter to be employed will depend upon the constitution of the concentrate and the roasting conditions to maintain the temperature at the desired point below about 950° C. The mixture of sinter and concentrates containing 11½ parts of the sinter to 32 parts of concentrate was roasted with a light ignition and a quick roasting in a bed of about two inches in depth.

In this process the mercury was completely driven out of the concentrate in a condensable form and recovered. 92% of the antimony was retained in the sinter residue and the percentage of antimony in the latter was brought up to about 39.5%.

By means of our invention, therefore, we have provided a process whereby mercury may be efficiently recovered from antimony-containing ores and a residue, rich in antimony, may be obtained.

What we claim is:—

1. A process of sintering ore material, rich in antimony and mercury sulphides, which comprises admixing said material with residues of a previous roasting operation, spreading said mixture in a bed, igniting it at one surface, and burning it at a temperature between 800° and 950° C. by a cross blast of air to remove the sulphur and mercury content.

2. The process of claim 1, in which said bed being roasted is from two to four inches in thickness.

3. The process of claim 1, in which the sintered material is from about 25% to 50% of the mixture.

4. A process of roasting ore material, rich in antimony and mercury sulphides, which comprises admixing with said ore material in finely divided condition, a quantity of previously sintered residues in a proportion from about 25 to 50% of the mixture, igniting and roasting said mixture in a bed of from two to four inches in thickness by a down-draft of air at a roasting temperature of from about 800° to 950° C. to remove the sulphur and mercury and leave the antimony content in the residue, crushing the resulting residue and admixing it with a quantity of moistened ore material for a subsequent roasting.

5. A process of sintering ore material, rich in antimony and mercury sulphides, which comprises admixing said material with residues of a previous roasting operation, spreading said mixture in a horizontal bed of from about two to four inches in thickness, igniting said bed at its upper surface and burning it with a down-draft of air at a roasting temperature of between 800 and 900° C. to remove the sulphur and mercury content therefrom and leave a residue rich in antimony compounds.

6. A process of sintering ore material containing antimony sulphides which comprises admixing with said material finely divided residues of a previous roasting operation, forming said mixture into a bed readily permeable to air, igniting said bed at its upper surface and burning it by a down blast of air at a temperature of from about 800° C. to about 950° C., to oxidize said sulphide to antimony tetroxide and to volatilize readily volatile metals.

7. A process of roasting ore material containing antimony sulphide which comprises roasting said material with a down-draft of air in a bed readily permeable to air in the presence of a diluent in sufficient quantity to maintain the roasting temperature of said bed at between about 800° C. and 950° C.

8. A method of obtaining mercury from ores containing antimony and other elements which comprises igniting a fuel in association with a bed of said ores permeable to air, blowing a blast of air through the burning fuel and ore to remove the mercury and to convert the antimony content to stable antimony oxide which remains with the residue.

REED W. HYDE.
ROBERT H. CROMWELL.